United States Patent
Krupa et al.

(10) Patent No.: US 10,894,857 B2
(45) Date of Patent: Jan. 19, 2021

(54) METHOD OF FORMING A POLYURETHANE FOAM ARTICLE

(71) Applicant: BASF SE, Ludwigshafen am Rhein (DE)

(72) Inventors: Michael J. Krupa, South Rockwood, MI (US); Robert S. Coleman, Livonia, MI (US); David Shtern, West Bloomfield, MI (US)

(73) Assignee: BASF SE, Ludwigshafen am Rhein (DE)

( * ) Notice: Subject to any disclaimer, the term of this patent is extended or adjusted under 35 U.S.C. 154(b) by 30 days.

(21) Appl. No.: 15/557,656

(22) PCT Filed: Mar. 9, 2016

(86) PCT No.: PCT/US2016/021518
§ 371 (c)(1),
(2) Date: Sep. 12, 2017

(87) PCT Pub. No.: WO2016/149001
PCT Pub. Date: Sep. 22, 2016

(65) Prior Publication Data
US 2018/0066099 A1 Mar. 8, 2018

Related U.S. Application Data

(60) Provisional application No. 62/132,940, filed on Mar. 13, 2015.

(51) Int. Cl.
| | |
|---|---|
| *C08G 18/48* | (2006.01) |
| *C08G 18/16* | (2006.01) |
| *C08G 18/76* | (2006.01) |
| *C08J 9/08* | (2006.01) |
| *C08G 18/18* | (2006.01) |
| *C08G 18/22* | (2006.01) |
| *C08G 18/40* | (2006.01) |
| *C08G 18/42* | (2006.01) |
| *C08J 9/00* | (2006.01) |
| *C08J 9/14* | (2006.01) |
| *C08G 101/00* | (2006.01) |

(52) U.S. Cl.
CPC ........... *C08G 18/163* (2013.01); *C08G 18/18* (2013.01); *C08G 18/225* (2013.01); *C08G 18/4018* (2013.01); *C08G 18/4208* (2013.01); *C08G 18/4816* (2013.01); *C08G 18/4829* (2013.01); *C08G 18/7664* (2013.01); *C08J 9/0061* (2013.01); *C08J 9/08* (2013.01); *C08J 9/146* (2013.01); *C08G 2101/005* (2013.01); *C08G 2101/0025* (2013.01); *C08J 2201/022* (2013.01); *C08J 2203/02* (2013.01); *C08J 2203/162* (2013.01); *C08J 2203/184* (2013.01); *C08J 2205/052* (2013.01); *C08J 2205/10* (2013.01); *C08J 2375/04* (2013.01); *C08J 2400/30* (2013.01)

(58) Field of Classification Search
CPC .... C08G 18/163; C08G 18/18; C08G 18/225; C08G 18/4018; C08G 18/4208; C08G 18/4816; C08G 18/4829; C08G 18/7664; C08G 2101/0025; C08G 2101/005; C08J 9/0061; C08J 9/08; C08J 9/146; C08J 2201/022; C08J 2203/02; C08J 2203/162; C08J 2203/184; C08J 2205/052; C08J 2205/10; C08J 2375/04; C08J 2400/30
See application file for complete search history.

(56) References Cited

U.S. PATENT DOCUMENTS

| | | |
|---|---|---|
| 5,721,285 A | 2/1998 | Nakamoto et al. |
| 6,534,556 B2 | 3/2003 | Lacarte et al. |
| 7,279,451 B2 | 10/2007 | Singh et al. |
| 2006/0173128 A1 | 8/2006 | Connolly |
| 2011/0039964 A1 | 2/2011 | Wiliams et al. |
| 2011/0218261 A1 | 9/2011 | Loh et al. |
| 2011/0303867 A1 | 12/2011 | Ling et al. |
| 2014/0005288 A1 | 1/2014 | Chen et al. |
| 2014/0371338 A1* | 12/2014 | Chen .................. C08G 18/4018 521/137 |
| 2016/0145374 A1 | 5/2016 | Ishikawa |

FOREIGN PATENT DOCUMENTS

| | | |
|---|---|---|
| EP | 1 178 062 A1 | 2/2002 |
| JP | 2014-058663 A | 4/2014 |
| RU | 2007/126960 A | 1/2009 |
| RU | 2394049 C2 | 7/2010 |
| WO | 01/32389 A1 | 5/2001 |
| WO | 2006/063702 A1 | 6/2006 |
| WO | WO 2008/121783 A1 | 10/2008 |
| WO | WO 2011/019528 A2 | 2/2011 |
| WO | 2012/115929 A2 | 8/2012 |
| WO | 2012/126916 A2 | 9/2012 |
| WO | WO 2012/150998 A1 | 11/2012 |
| WO | WO 2014/030654 A1 | 2/2014 |
| WO | 2015/012267 | 1/2015 |

OTHER PUBLICATIONS

International Search Report for Application No. PCT/US2016/021518 dated May 25, 2016, 4 pages.
BASF, "Safety Data Sheet—Autofroth 95 B 1306 Resin", Nov. 14, 2013, pp. 2-7.
BASF, "Technical Product Data—Autofroth 95-B-1402 Resin/Autofroth 10000A Isocyanate Rigid Urethane Foam System", Oct. 27, 2014, 2 pages.
BASF, "Urethane Chemicals Case Product Line - Coatings, Adhesives & Binders, Sealants, Elastomers", 2010, pp. 1-12.

(Continued)

*Primary Examiner* — John M Cooney
(74) *Attorney, Agent, or Firm* — DLA Piper LLP (US)

(57) ABSTRACT

A method of forming a polyurethane foam article includes the step of forming a resin composition. The resin composition includes a polyol component, an amine catalyst, and a blowing component. The blowing component includes a hydrofluoroolefin and formic acid. The method also includes the steps of combining the resin composition, a recycled resin composition, and an isocyanate component to form a reaction mixture and discharging the reaction mixture to form the polyurethane foam article.

12 Claims, No Drawings

(56) References Cited

OTHER PUBLICATIONS

BASF, "Technical Product Data—Autofroth 95-B-1306 Resin/Autofroth 9300A Isocyanate Rigid Urethane Foam System", Nov. 5, 2013, 2 pages.
Momentive Performance Materials, "Material Safety Data Sheet—Niax Silicone L-6972—Siloxane Polyalkyleneoxide Copolymer", Jan. 22, 2013, pp. 1-8.
Database WPI, Week 201425, Thomson Scientific, London, GB; AN 2014-D75396, XP002756939.
English language abstract and machine-assisted English translation of Equivalent JP 2014-058663 for WO 2014/030654 extracted from espacenet.com database on Sep. 20, 2017, 28 pages.
Search Report from counterpart Russian Patent Application No. 2017136173 dated Aug. 2, 2019.
Notification of Reasons for Refusal from counterpart Japanese Patent Appln. No. 2017-548288 dated Feb. 3, 2020, and its English translation.
First Office Action from counterpart Chinese Patent Application No. 201680026971.0 dated May 13, 2020, and its English translation.

* cited by examiner

METHOD OF FORMING A POLYURETHANE FOAM ARTICLE

RELATED APPLICATIONS

The present application is the National Stage of International Patent Application No. PCT/US2016/021518, filed Mar. 9, 2016, which claims priority to U.S. Provisional Application No. 62/132,940, filed Mar. 13, 2015, the disclosure of which is specifically incorporated by reference in its entirety.

BACKGROUND OF THE DISCLOSURE

1. Field of the Disclosure

The subject disclosure generally relates to a method of forming a polyurethane foam article. More specifically, the subject disclosure relates to a method of forming a polyurethane foam article comprising the reaction product of a resin composition and an isocyanate.

2. Description of the Related Art

In the building, transportation, and appliance industries, polyurethane foam is used to insulate structures. As insulation, a polyurethane foam functions as a seamless and maintenance-free air barrier which provides many benefits, such as prevention of moisture infiltration and mold growth and reduction of energy use, e.g. a reduction in heating and/or cooling costs.

As is also known in the art, the polyurethane foam is formed from the exothermic reaction of a resin composition and an isocyanate component, i.e., a polyurethane system. Commercially, the resin composition, which includes a mixture of polyols, blowing agents, catalysts, and other components, is supplied as a first component, e.g. as an A-side component. The isocyanate component, which is reacted with the resin composition, is supplied as a second component, e.g. a B-side component. The resin composition includes various components, e.g. reactants, catalysts, blowing agents, which can react over time and reduce the shelf life of, or prevent recycling of, the resin composition. To this end, a resin composition, and an isocyanate component are selected to optimize the storage stability, application properties, and recyclability of a polyurethane system, and also to optimize the performance properties of a polyurethane foam article for a particular use.

SUMMARY OF THE DISCLOSURE AND ADVANTAGES

A method of forming a polyurethane foam article includes the step of forming a resin composition. The resin composition includes a polyol component, an amine catalyst, and a blowing component. The blowing component includes a hydrofluoroolefin and formic acid. The method also includes the steps of combining the resin composition, a recycled resin composition, and an isocyanate component to form a reaction mixture and discharging the reaction mixture to form the polyurethane foam article.

DETAILED DESCRIPTION OF THE DISCLOSURE

A polyurethane system, a method of forming a polyurethane foam article with the polyurethane system, and a polyurethane foam article is disclosed. The polyurethane foam article of the present disclosure is typically used to insulate structures. As insulation, the polyurethane foam article functions as a seamless and maintenance-free air barrier which provides many benefits, such as prevention of moisture infiltration and mold growth and reduction of heating and cooling costs. The polyurethane foam article is formed with a polyurethane system comprising a resin composition, a blowing component, and an isocyanate component. The polyurethane system is selected to optimize application efficiency and performance properties of the polyurethane foam article for a particular use. For example, when using the polyurethane foam article to insulate structures, the components of the polyurethane system are selected such that the application and the performance properties, e.g. insulative, adhesive, and other properties, of the polyurethane foam article formed therefrom are optimized.

In various embodiments, the polyurethane system of the subject disclosure is described as a "froth" foam system. In such embodiments, a "froth foaming mixture" is produced by combining a stream including the resin composition, including one or more polyols, a blowing component, and other additives (for example, from an A-side vessel) with a stream comprising the isocyanate component (for example from a B-side vessel) to form a reaction mixture wherein the blowing component sufficiently and spontaneously vaporizes when the two combined streams are exposed to atmospheric pressure upon discharge from a dispensing head to produce a froth. Thus, the blowing component acts as a frothing agent. It is to be understood that not all of the blowing component needs to vaporize instantaneously from/in the reaction mixture when discharged, but at least an amount sufficient to produce a froth upon discharge from the dispensing head onto a substrate.

Referring now to the specific components of the polyurethane system, the resin composition includes a polyol component, an amine catalyst, and optionally recycled resin composition. In some embodiments, the resin composition also includes the blowing component. In many embodiments, the resin composition is an amber liquid having a viscosity of less than about 900, alternatively from about 200 to about 800, alternatively from about 300 to about 700, alternatively from about 400 to about 600, alternatively from about 450 to about 550, cps at 25° C.

In a typical embodiment, the resin composition mixture (which including the resin composition, which may include recycled resin composition form a previous generation, and the recycled resin composition combined (e.g. in an A-side vessel as is described below) have a viscosity of less than about 900, alternatively from about 200 to about 800, alternatively from about 300 to about 700, alternatively from about 400 to about 600, alternatively from about 450 to about 550, cps at 25° C.

The resin composition includes a polyol component. The polyol component includes one or more polyols, and typically includes a combination of polyols. The polyol includes one or more OH functional groups, typically at least two OH functional groups. Typically, the polyol is selected from the group of polyether polyols, polyester polyols, polyether/ester polyols, biopolyols and combinations thereof; however, other polyols may also be employed. Various polyols and other components which can be included in the resin composition of the subject disclosure are set forth in U.S. Pat. No. 6,534,556, which is included herein in its entirety by reference.

In some embodiments, the polyol component is included in the resin composition in an amount of from about 30 to about 99, alternatively from about 40 to about 95, alternatively from about 50 to about 80, alternatively from about 60 to about 70, percent by weight based on the total weight of the resin composition. The amount of the polyol component may vary outside of the ranges above, but is typically both whole and fractional values within these ranges. Further, it is to be appreciated that more than one polyol may be included in the polyol component, in which case the total amount of all the polyols included is within the above ranges.

In some embodiments, the polyol component includes one or more polyether polyols. In such embodiments, the polyol component includes one or more polyether sucrose-glycerin polyols, i.e. a polyol formed with sucrose and/or glycerin initiator.

In some embodiments, the polyol component includes a first polyether polyol. The first polyether polyol is formed from a sucrose and/or a glycerin initiator. The first polyol typically has: a number average molecular weight of from about 400 to about 800, alternatively from about 500 to about 700 g/mol; a hydroxyl number of from about 300 to about 500, alternatively from about 350 to about 450, mg KOH/g; a functionality of greater than 3, alternatively from about 4 to about 5; and a viscosity of less than about 5,000, alternatively from about 3,000 to about 4,000, cps at 25° C. Of course, the number average molecular weight, the hydroxyl number, the functionality, and the viscosity of the first polyether polyol may be any value or range of values, both whole and fractional, within those ranges and values described above and/or may vary from the values and/or range of values above by ±5%, ±10%, ±15%, ±20%, ±25%, ±30%, etc.

In some embodiments, the resin composition includes from about 40 to about 50, alternatively from about 30 to about 60, percent by weight of the first polyether polyol based on total weight of the polyol component. The amount of the first polyether polyol may vary outside of the ranges above, but is typically both whole and fractional values within these ranges.

In some embodiments, the polyol component includes a second polyether polyol. The second polyether polyol is also formed from a sucrose and/or a glycerin initiator. The second polyol typically has: a number average molecular weight of from about 500 to about 800, alternatively from about 600 to about 700, g/mol; a hydroxyl number of from about 300 to about 600, alternatively from about 400 to about 500, mg KOH/g; a functionality of greater than 4, alternatively from about 5 to about 6; and a viscosity of greater than about 15,000, alternatively greater than about 30,000, alternatively from about 15,000 to about 40,000, alternatively from about 30,000 to about 40,000, cps at 25° C. Of course, the number average molecular weight, the hydroxyl number, the functionality, and the viscosity of the second polyether polyol may be any value or range of values, both whole and fractional, within those ranges and values described above and/or may vary from the values and/or range of values above by ±5%, ±10%, ±15%, ±20%, ±25%, ±30%, etc.

In some embodiments, the resin composition includes from about 5 to about 40, alternatively from about 10 to about 20, percent by weight of the second polyether polyol based on total weight of the polyol component. The amount of the second polyether polyol may vary outside of the ranges above, but is typically both whole and fractional values within these ranges.

In some embodiments, the polyol component includes a third polyether polyol. The third polyether polyol typically has: a number average molecular weight of from about 500 to about 900, alternatively from about 600 to about 800, g/mol; a hydroxyl number of from about 100 to about 400, alternatively from about 200 to about 300, mg KOH/g; a functionality of greater than 2, alternatively from about 2 to about 4; and a viscosity of less than about 500, alternatively from about 100 to about 300, cps at 25° C. Of course, the number average molecular weight, the hydroxyl number, the functionality, and the viscosity of the third polyether polyol may be any value or range of values, both whole and fractional, within those ranges and values described above and/or may vary from the values and/or range of values above by ±5%, ±10%, ±15%, ±20%, ±25%, ±30%, etc.

In some embodiments, the resin composition includes from about 5 to about 40, alternatively from about 10 to about 20, percent by weight of the third polyether polyol based on total weight of the polyol component. The amount of the third polyether polyol may vary outside of the ranges above, but is typically both whole and fractional values within these ranges.

In some embodiments, the polyol component includes a polyester polyol. The polyester polyol is typically an aromatic polyester polyol. The polyester polyol typically has: a number average molecular weight of from about 500 to about 900, alternatively from about 600 to about 800, g/mol; a hydroxyl number of from about 100 to about 400, alternatively from about 200 to about 300, mg KOH/g; a functionality of greater than 2, alternatively from about 2 to about 3; and a viscosity of from about 1,500 to about 15,000, alternatively from about 4,000 to about 15,000, alternatively from about 6,000 to about 15,000, alternatively from about 8,000 to about 14,000, alternatively from about 10,000 to about 14,000, cps at 25° C. Of course, the number average molecular weight, the hydroxyl number, the functionality, and the viscosity of the polyester polyol may be any value or range of values, both whole and fractional, within those ranges and values described above and/or may vary from the values and/or range of values above by ±5%, ±10%, ±15%, ±20%, ±25%, ±30%, etc.

In some embodiments, the resin composition includes from about 5 to about 50, alternatively from about 15 to about 25, percent by weight of the polyester polyol based on total weight of the polyol component. The amount of the polyester polyol may vary outside of the ranges above, but is typically both whole and fractional values within these ranges.

In some embodiments, the polyol component includes a bio-based polyol such as glycerin or castor oil. As demonstrated above, number average molecular weight, hydroxyl number, and functionality of the polyol can vary. As such, the polyols referenced above are exemplary in nature and are not to be construed as limiting.

In various preferred embodiments, the polyol component includes the first polyether polyol and the second polyether polyol. In such embodiments, the first and second polyether polyols are present in a ratio of from about 1:1 to about 5:1, alternatively from about 1:2 to about 1:4. In such preferred embodiments, the polyol component can also include the third polyether polyol and the polyester polyol.

In many embodiments, the resin composition includes recycled resin composition. The recycled resin composition is a component of, and different than, the resin composition. In the broadest sense, the recycled resin composition can be defined as any resin composition which was produced prior to the resin composition which it is included in. As such, the recycled resin composition is any unused or left-over resin composition which was produced prior to the production of the resin composition. In some embodiments, the recycled resin composition is formed greater than about 2, alternatively greater than about 3, alternatively greater than about 4, alternatively greater than about 5, alternatively greater than about 6, alternatively greater than about 7, alternatively greater than about 8, alternatively greater than about 9, months prior to formation of the resin composition, i.e., prior to the step of mixing the components of the resin composition together to form the resin composition. As an example, recycled resin composition can be unused resin composition which remains in the A-side vessel when the vessel is refilled with "new" or "fresh" resin composition. Said differently, the recycled resin composition can be left-over resin composition from a prior use of the A-side vessel, the use of which is environmentally and commercially economical.

In many embodiments, one or more generations of recycled resin composition can be included in the resin composition. For example, the resin composition and the recycled resin composition can be mixed and supplied to a user in an A-side vessel. This mixture can be referred to as the "resin composition mixture". Once used, the A-side vessel is returned with the mixture of the resin composition and the recycled resin composition remaining in the A-side vessel. Once returned, the resin composition mixture is simply "recycled resin composition" which includes, in this example, two generations of recycled resin composition, i.e., two distinct generations of previously made resin composition. A resin composition can be formed and then combined with this recycled resin composition and supplied to a user in the A-side vessel. Once combined, this A-side vessel includes two generations of recycled resin. Such recycling can go on and on, with the use of multiple generations of recycle resin included in the A-side vessel. In such a scenario, the amount of each progressive generation of resin composition which is recycled and supplied in the A-side vessel gets progressively smaller. Eventually, equilibrium is reached with respect to an amount of recycled resin which is combined with the resin composition and in this example included in the A-side vessel. Said differently, the amount of recycled resin which is combined with the resin composition (fresh resin) in the A-side vessel stabilizes.

The recycle example set forth in the preceding paragraph is exemplary in nature. Recycled resin composition could also be generated as "left over" or "excess" resin composition which is produced in a resin composition and vessel filling manufacturing processes. Like the scenario above, the recycled resin composition generated in the manufacturing processes becomes the recycled resin composition which can be mixed with another "fresh" batch of the resin composition.

Advantageously, the resin composition is formulated in such a manner that a mixture of the resin composition and the recycled resin composition (e.g. a resin composition mixture) has an excellent shelf life. That is, the resin composition mixture (including one or more generations of recycled resin) exhibits consistent processing characteristics and maintains a consistent reactivity which allows for the consistent formation of the polyurethane foam article having excellent physical properties.

In some embodiments, the resin composition includes from about 0.1 to about 10, alternatively from about 0.1 to about 8, alternatively from about 0.1 to about 6, percent by weight recycled resin composition based on total weight of the resin composition. The amount of the recycled resin composition may vary outside of the ranges above, but is typically both whole and fractional values within these ranges. Further, as is set forth above, it is to be appreciated that more than one type or generation of recycled resin composition may be included in the resin composition, in which case the total amount of all the recycled resin composition included is within the above ranges.

In various alternative embodiments, the resin composition and the recycled resin composition are separate from one another and combined later to form a resin composition mixture, and then the resin composition mixture and the isocyanate component (described below) are combined. In such embodiments, the resin composition mixture includes from about 0.1 to about 10, alternatively from about 0.1 to about 8, alternatively from about 0.1 to about 6, percent by weight recycled resin composition based on total weight of the resin composition mixture.

In other alternative embodiments, the resin composition, the recycled resin composition, and the isocyanate component are stored separately right up to the step of combining and subsequent formation of the polyurethane foam article. In such embodiments, the resin composition includes from about 0.1 to about 10, alternatively from about 0.1 to about 8, alternatively from about 0.1 to about 6, percent by weight recycled resin composition based on the combined weight of the resin composition and the recycled resin composition. The amount of the recycled resin composition may vary outside of the ranges above, but is typically both whole and fractional values within these ranges. Further, it is to be appreciated that more than one type of recycled resin composition may be utilized, in which case the total amount of all the recycled resin composition is within the above ranges.

The resin composition includes a blowing component. The blowing component comprises the blowing agents which are included in the resin composition. The blowing component includes a hydrofluoroolefin (HFO) and formic acid, and in many embodiments the blowing component also includes water. In some embodiments, the blowing component is included in the resin composition in an amount of from about 1 to about 45, alternatively from about 5 to about 30, alternatively from about 10 to about 20, percent by weight based on the total weight of the resin composition. The amount of the blowing component may vary outside of the ranges above, but is typically both whole and fractional values within these ranges. Further, it is to be appreciated that more than one blowing agent may be included in the blowing component, in which case the total amount of all the blowing agents included is within the above ranges.

As set forth above, the blowing component includes a HFO. HFOs are chemical compounds comprising hydrogen, fluorine, and carbon atoms. HFOs are distinguished from hydrofluorocarbons (HFCs) by being derivatives of alkenes (olefins) rather than alkanes. In some embodiments, the HFO is selected from the group of trans-1-chloro-3,3,3-trifluoropropene, 2,3,3,3-tetrafluoropropene, 1,3,3,3-tetrafluoropropene, and combinations thereof. In a preferred embodiment, the HFO is or comprises trans-1-chloro-3,3,3-trifluoropropene. In some embodiments, the blowing component includes from about 30 to about 95, alternatively from about 70 to about 90, percent by weight of the HFO, e.g. trans-1-chloro-3,3,3-trifluoropropene, based on total weight of the blowing component. The amount of the HFO may vary outside of the ranges above, but is typically both whole and fractional values within these ranges.

HFO's are physical blowing agents. Inclusion of one or more physical blowing agents in the blowing component is believed to reduce the thermal conductivity of the polyurethane foam coating. Physical blowing agents typically boil the exotherm foaming temperature or less, preferably at about 50° C., or less. The resin composition can include additional physical blowing agents. Preferred additional physical blowing agents include those which have a zero ozone depletion potential. Examples of physical blowing agents include volatile non-halogenated hydrocarbons having two to seven carbon atoms such as alkanes, alkenes, cycloalkanes having up to 6 carbon atoms, dialkyl ether, cycloalkylene ethers and ketones; and HFCs. Suitable additional physical blowing agents for the purposes of the subject disclosure may include HFCs, chlorofluorocarbons (CFCs), hydrocarbons, and combinations thereof.

The blowing component also includes formic acid, a chemical blowing agent. In some embodiments, the blowing component includes from about 1 to about 20, alternatively from about 5 to about 15, percent by weight of the formic acid based on total weight of the blowing component. The amount of the formic acid may vary outside of the ranges above, but is typically both whole and fractional values within these ranges. The formic acid included in the blowing component is believed to reduce chemical interaction between the HFOs such as trans-1-chloro-3,3,3-trifluoropropene and the amine catalyst and the decomposition of the amine catalyst resulting therefrom. Without being bound by theory, it is believed that the inclusion of the formic acid, in combination with the other claimed components increases the storage stability and recyclability of the resin composition.

The resin composition can include additional chemical blowing agents. In many embodiments, the blowing component also includes a chemical blowing agent, such as water. If water is included, the blowing component includes from about 1 to about 20, alternatively from about 5 to about 15, percent by weight of the water based on total weight of the blowing component. The amount of the water may vary outside of the ranges above, but is typically both whole and fractional values within these ranges.

The resin composition includes one or more catalysts. The catalyst is typically present in the resin composition to catalyze the exothermic reaction between the resin composition and the isocyanate. It is to be appreciated that the catalyst is typically not consumed in the exothermic reaction between the resin composition and the isocyanate component. The catalyst may include any suitable catalyst or mixtures of catalysts known in the art. Examples of suitable catalysts include, but are not limited to, gelation catalysts, e.g. amine catalysts in dipropylene glycol; blowing catalysts, e.g. bis(dimethylaminoethyl)ether in dipropylene glycol; and metal catalysts, e.g. tin, bismuth, lead, etc. If included, the catalyst can be included in various amounts.

The resin composition typically includes an amine catalyst. Suitable amine catalysts for purposes of the present disclosure include, but are not limited to, catalytic amines, such as primary, secondary, and tertiary, cyclic and acyclic catalytic amines.

In addition to the catalyst, the resin composition optionally includes a surfactant. The surfactant typically supports homogenization of the blowing agent and the polyol and regulates a cell structure of the polyurethane foam. The surfactant may include any suitable surfactant or mixtures of surfactants known in the art. Non-limiting examples of suitable surfactants include various silicone surfactants, salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxaneoxyalkylene copolymers and other organopolysiloxanes, oxyethylated alkyl-phenols, oxyethylated fatty alcohols, paraffin oils, castor oil, castor oil esters, and ricinoleic acid esters, and cell regulators, such as paraffins, fatty alcohols, and dimethylpolysiloxanes. In some embodiments, the surfactant has a viscosity of from about 300 to about 2,500 cps at 25° C. In a preferred embodiment, the resin composition includes organosilicone copolymer surfactant having a viscosity of from about 1800 to about 2500 cps at 25° C. If included, the surfactant may be included in the resin composition in various amounts.

In addition to the surfactant, the resin composition optionally includes a flame retardant. The flame retardant may include any suitable flame retardant or mixtures of flame retardants known in the art. Non-limiting examples of suitable flame retardants include tricresyl phosphate, tris(2-chloroethyl) phosphate, tris(2-chloropropyl) phosphate (TCPP), tris(2,3-dibromopropyl) phosphate, red phosphorous, aluminum oxide hydrate, antimony trioxide, arsenic oxide, ammonium polyphosphate and calcium sulfate, molybdenum trioxide, ammonium molybdate, ammonium phosphate, pentabromodiphenyloxide, 2,3-dibromopropanol, hexabromocyclododecane, dibromoethyldibromocyclohexane, expandable graphite or cyanuric acid derivatives, melamine, and corn starch. In a preferred embodiment, the resin composition includes TCPP. If included, the flame retardant can be included in the resin composition in various amounts.

The resin composition optionally includes one or more additives. The additive may include any suitable additive or mixtures of additives known in the art. Suitable additives for purposes of the present disclosure include, but are not limited to, chain-extenders, dyes, indicator dyes, cross-linkers, chain-terminators, processing additives, adhesion promoters, anti-oxidants, defoamers, anti-foaming agents, water scavengers, molecular sieves, fumed silicas, ultraviolet light stabilizers, fillers, thixotropic agents, silicones, colorants, inert diluents, and combinations thereof. Of course, additives also include catalysts and surfactants known in the art but not described above. If included, the additive can be included in the resin composition in various amounts.

In various embodiments, the resin composition typically has a viscosity of less than about 900, alternatively from about 300 to about 700, alternatively from about 400 to about 600, cps at 25° C. As alluded to above, because the resin composition is chemically stable, it can be recycled and has an excellent shelf life. Shelf life can be defined as a period of time over which the resin composition produces foam having consistent properties, and/or a period of time over which the components of the resin composition are stable. From a practical perspective, the shelf life is the period of time over which the quality of the foam produced with the resin composition does not deteriorate to a predetermined extent (i.e. the foam produced with the resin meets certain quality requirements). To this end, in many embodiments, the resin composition has a shelf life of greater than about 4, alternatively greater than about 5, alternatively greater than about 6, alternatively greater than about 7, alternatively greater than about 8, months when stored at 25° C. Said differently, the resin composition can be stored for 4, 5, 6, 7, 8, or even more months, and the components thereof, e.g. the amine catalyst and the trans-1-chloro-3,3,3-trifluoropropene and other components, do not interact, chemically or otherwise, to reduce the reactivity of the resin and negatively impact the properties of the polyurethane foam article formed therefrom.

The polyurethane system of the present disclosure also includes the isocyanate component. The isocyanate component includes one or more types of isocyanate. Any combination of the different types of the isocyanate described herein can be included in the isocyanate component. The isocyanate may be a polyisocyanate having two or more functional groups, e.g. two or more NCO functional groups. Suitable isocyanates for purposes of the present disclosure include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate may be an isocyanate prepolymer. The isocyanate prepolymer is typically a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific isocyanates that may be used for purposes of the present disclosure include, but are not limited to, toluylene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-dissocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate.

In a preferred embodiment, the isocyanate component includes MDIs and pMDIs. In another preferred embodiment, the isocyanate component consists essentially of MDIs and pMDIs. In yet another preferred embodiment, the isocyanate component consists of MDIs and pMDIs. In many embodiments, the isocyanate component is a dark brown liquid having a viscosity of less than about 600, alternatively from about 100 to about 500, alternatively from about 100 to about 400, alternatively from about 100 to about 300, alternatively from about 150 to about 250, cps at 25° C.

The subject disclosure also provides a method of forming the polyurethane foam article. The method of forming the polyurethane foam article includes the steps of: forming a resin composition; combining the resin composition, the recycled resin composition, and an isocyanate component to form a reaction mixture; and discharging the reaction mixture to form the polyurethane foam article. The resin composition, the recycled resin composition, and the isocyanate component are just as described above.

In a preferred embodiment, the method includes the steps of providing a resin composition (having the recycled resin composition therein) in an A-side vessel, providing an isocyanate component in a B-side vessel, combining the resin composition with the isocyanate component to form a reaction mixture, and discharging the reaction mixture to form the polyurethane foam. In various preferred embodiments, the A-side vessel has a pressure of less than about 700, alternatively from about 300 to about 600, alternatively from about 400 to about 600, alternatively from about 450 to about 550, psi at 25° C. In various preferred embodiments, the B-side vessel has a pressure of less than about 700, alternatively from about 300 to about 600, alternatively from about 400 to about 600, alternatively from about 450 to about 550, psi at 25° C.

In one embodiment, the unreacted resin composition and the isocyanate component are supplied in the A-side and the B-side container, the components of which are collectively referred to as the polyurethane system and are just as described above. Typically, the A-side and B-side container, i.e., the polyurethane system, are supplied together. The components of the polyurethane system are selected to provide application efficiency and the desired performance properties of the polyurethane foam article for a particular use. For example, when using the polyurethane foam article to insulate structures, the components of the polyurethane system are selected to provide the polyurethane system having application robustness, resin composition stability and recyclability, etc., and are also selected to provide the polyurethane foam article having the desired insulative, adhesive, and other properties.

In some embodiments, the method includes the step of mixing the polyol component, the amine catalyst, the recycled resin composition, and the blowing component prior to the step of providing the resin composition in an A-side vessel. In such embodiments, the recycled resin composition is formed greater than about 2, alternatively greater than about 3, alternatively greater than about 4, alternatively greater than about 5, alternatively greater than about 6, alternatively greater than about 7, alternatively greater than about 8, alternatively greater than about 9, months prior to the step of mixing the components of the resin composition together to form the resin composition.

As is also set forth above, the method also includes the step of combining the resin composition, the recycled resin composition, and the isocyanate component. In a preferred embodiment, the method also includes the step of combining the resin composition having the recycled resin composition therein with the isocyanate component. In some embodiments, the step of combining is further defined as first combining the resin composition and the recycled resin composition to form a resin composition mixture, and then combining the resin composition mixture and the isocyanate component to form the reaction mixture. In a preferred embodiment, the method includes the step of heating the resin composition having the recycled resin composition therein (or the resin composition mixture, or each of the resin composition and the recycled resin composition) and the isocyanate to a temperature of from about 20° C. to about 35° C., and more preferably to a temperature of from about 24° C. to about 30° C., prior to the step of combining the resin composition with the isocyanate in the presence of the blowing agent to form the reaction mixture. The resin composition and the isocyanate may be combined by any mechanism known in the art to form the reaction mixture.

Typically, the step of combining is conducted in a mixing apparatus such as a static mixer, impingement mixing chamber, or a mixing pump. In a preferred embodiment, the step of combining is conducted in a static mix head. The step of combining can include various processes known in the art, such as spray processes or molding processes. If molded, many embodiments of the polyurethane system are molded in a mold having a temperature of from about 25 to about 40° C.

Typically, the resin composition/polyol component and the isocyanate component are combined at an isocyanate index of from about 75 to about 140, alternatively from about 80 to about 130, alternatively from about 90 to about 130, alternatively from about 90 to about 120, alternatively from about 105 to about 120, alternatively from about 105 to about 115. In many embodiments, the resin composition and the isocyanate component are combined at a weight ratio of about 0.6:1 to about 1.1:1.

As indicated above, the method includes the step of discharging the reaction mixture to form the polyurethane foam article. The reaction mixture can be discharged by various techniques, such as spraying, pouring, or molding. In some embodiments, the reaction mixture is discharged at a pressure of from about 150 to about 1,000, alternatively from about 300 to about 600, alternatively from about 150 to about 600, alternatively from about 200 to about 300, psi. In some embodiments, the reaction mixture is discharged at a rate of from about 1 to about 600, alternatively from about 1 to about 120, alternatively from about 1 to about 40, alternatively from about 3 to about 40, alternatively from about 4 to about 20, alternatively from about 6 to about 15, lbs/min. It is contemplated that the reaction mixture may be discharged at any combination of pressures or rates or range of pressures or rates within the ranges set forth above.

Like the components of the polyurethane system, the particular discharging/application technique is selected to optimize application efficiency and the performance properties of the polyurethane foam article for a particular use. Slight variations in the application technique affect the performance properties of the polyurethane foam article. Consequently, certain guidelines are often set forth for certain application techniques.

The subject disclosure also provides the polyurethane foam article. In various embodiments, the polyurethane foam article has an overall density of from about 1.8 to about 3, alternatively from about 1.6 to about 2.8, alternatively from about 2.3 to about 2.35, pcf, and a core density of from about 1.9 to about 2.1, alternatively from about 1.9 to about 2.1, alternatively from about 1.95 to about 2.05, pcf, when tested in accordance with ASTM D-1622. In other embodiments, the polyurethane foam article has a compressive strength in the parallel direction at 10% deflection of greater than about 10, alternatively from about 15 to about 45, alternatively from about 15 to about 25, psi, and has a compressive strength in the perpendicular direction at 10% deflection of greater than about 10, alternatively from about 10 to about 35, alternatively from about 15 to about 25, psi, when tested in accordance with ASTM D-1621.

As is set forth above, the polyurethane foam article is often utilized as insulation. To this end, many embodiments of the polyurethane foam article have an initial K-factor of less than about 0.25, alternatively less than about 0.16, alternatively less than about 0.13, BTU-in/hr/ft$^2$/° F. when tested in accordance with ASTM C-518. Further, many embodiments of the polyurethane foam article have a water absorption of less than about 0.1, alternatively less than about 0.03, lbs/ft$^2$ when tested in accordance with ASTM D-2842.

The polyurethane foam article can be a rigid or a flexible foam article, but is typically a rigid foam article. As such, the term "rigid" foam typically excludes flexible foams. Non-limiting examples of various physical properties that may be measured to distinguish the rigid foam article of many embodiments include density, compressive strength, compression modulus, air flow (lack thereof), elongation, tensile strength, etc. In some embodiments, the term "rigid foam" article is meant to describe a foam having a high ratio of compressive strength to tensile strength, e.g., about 0.5:1 or greater, and an elongation of about 10 percent or less. In some embodiments, the polyurethane foam article is a rigid foam article having a closed cell content of greater than about 80, alternatively greater than about 85, alternatively greater than about 90, percent closed cells.

The following example is intended to illustrate the disclosure and is not to be viewed in any way as limiting to the scope of the disclosure.

EXAMPLE

The polyurethane foam of Example 1 is in accordance with the present disclosure. As is described further below, Resin Composition 1 is reacted with Isocyanate Component 1 to form the polyurethane foam article of Example 1. Resin Composition 1 is described in Table 1 immediately below.

TABLE 1

| Component | Amount (g) |
| --- | --- |
| Polyol A | 3180 |
| Polyol B | 1000 |
| Polyol C | 1500 |
| Polyol D | 900 |
| Flame Retardant A | 1200 |
| Surfactant A | 300 |
| Catalyst A | 150 |
| Catalyst B | 150 |
| Catalyst C | 100 |
| Blowing Agent A | 160 |
| Blowing Agent B | 160 |
| Blowing Agent C | 1200 |
| Recycled Resin Composition | Up to 1000 g |
| Shelf Life | Greater than 8 months |

Polyol A is a sucrose/glycerin based polyether polyol having a nominal functionality of 4.0, a hydroxyl number of 368 mg KOH/g, and a viscosity of 3500 cps at 25° C.

Polyol B is a sucrose/glycerin based polyether polyol having a nominal functionality of 5.5, a hydroxyl number of 470 mg KOH/g, and a viscosity of 35,000 cps at 25° C.

Polyol C is a modified aromatic polyester polyol having a nominal functionality of 2.3, a hydroxyl number of 258 mg KOH/g, and a viscosity of 12,000 cps at 25° C.

Polyol D is a glycerin based trifunctional polyether polyol formed by adding propylene oxide to glycerin having a nominal functionality of 3, a hydroxyl number of 230 mg KOH/g, and a viscosity of 270 cps at 25° C.

Flame Retardant A is Tris (1-chloro-2-propyl) phosphate.
Surfactant A is a silicone based co-polymer surfactant.
Catalyst A is a blowing catalyst.
Catalyst B is a tertiary amine catalyst.
Catalyst C is a solution of potassium-octoate in diethylene glycol.

Blowing Agent A is formic acid.
Blowing Agent B is water.
Blowing Agent C is trans-1-chloro-3,3,3-trifluoropropene.

Isocyanate Component A is a mixture of diphenylmethane diisocyanate and polymeric diphenylmethane diisocyanate.

Resin Composition 1 and Isocyanate Component 1 are heated to 80° F. Once heated, Resin Composition 1 and Isocyanate Component 1 are combined at a 1:1 weight ratio to form a reaction mixture which is discharged into a mold having a temperature of 90° C. The reaction mixture has a gel time of 80 seconds, a tack time of 140 seconds, and a free rise density of 1.6 pcf. Accordingly, the polyurethane foam article of Example 1 is formed. A 2 ft.×2 ft.×2.5 in. test panel comprising the polyurethane foam article of Example 1 is tested for various physical properties. The test results are set forth in Table 2 immediately below.

TABLE 2

| Physical Property | Test Method | Result |
|---|---|---|
| Overall Density | ASTM D-1622 | 2.33 pcf |
| Core Density | ASTM D-1622 | 2.00 pcf |
| Compressive Strength | ASTM D-1621 (Parallel) | 21 psi |
| Compressive Strength | ASTM D-1621 (Perpendicular) | 16 psi |
| K-Factor, Initial | ASTM 518 | 0.152 BTU-in/hr/ft$^2$/° F. |
| Porosity | NA | 86% closed cells |
| Water Absorption | ASTM-D2842 | 0.026 lbs/ft$^2$ |
| Dimensional Stability | ASTM D-2126 158° F./100% RH | 2% volume change over 28 days |
|  | ASTM D-2126 100° F./100% RH | 1% volume change over 28 days |
|  | ASTM D-2126 158° F. | −1% volume change over 28 days |
|  | ASTM D-2126 200° F. | 1% volume change over 28 days |
|  | ASTM D-2126 −20° F. | 2% volume change over 28 days |

Advantageously, the Resin Composition 1 has a shelf life of greater than 8 months. Further, resin composition 1, which includes recycled resin content, can be used to form the polyurethane foam article of Example 1 which exhibits excellent insulation and water absorption properties.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A method of forming a polyurethane foam article, said method comprising the steps of:
  forming a recycled resin composition and leaving the recycled resin composition in an A-side vessel;
  forming a resin composition about 2 months or more after formation of the recycled resin composition, the resin composition comprising:
    (i) a polyol component consisting of:
      a first polyether polyol having a viscosity of less than about 5,000 cps at 25° C.;
      a second polyether polyol having a viscosity of greater than about 30,000 cps at 25° C.;
      a third polyether polyol having a viscosity of less than about 500 cps at 25° C.; and
      an aromatic polyester polyol;
    (ii) an amine catalyst; and
    (iii) a blowing component comprising:
      (a) a hydrofluoroolefin, and
      (b) formic acid;
  providing the resin composition in the A-side vessel having the recycled resin composition therein to form a resin composition mixture;
  providing an isocyanate component in a B-side vessel;
  combining the resin composition, the recycled resin composition, and the isocyanate component to form a reaction mixture; and discharging the reaction mixture to form the polyurethane foam article.

2. A method as set forth in claim 1 wherein the resin composition mixture has a viscosity of less than about 900 cps at 25° C.

3. A method as set forth in claim 1 wherein the resin composition mixture has a shelf life of greater than about 6 months.

4. A method as set forth in claim 1 wherein the step of combining the resin composition mixture and the isocyanate component to form the reaction mixture is conducted in a static mix head.

5. A method as set forth in claim 1 wherein the recycled resin composition is present in the resin composition mixture in an amount of from about 0.1 to about 10 percent by weight based on total weight of the resin composition mixture.

6. A method as set forth in claim 1 wherein the A-side and B-side vessels have a pressure of less than about 700 psi at 25° C.

7. A method as set forth in claim 1 wherein the formic acid is present in the resin composition in an amount of from about 1 to about 20 percent by weight based on total weight of the blowing agents included in the resin composition and/or the hydrofluoroolefin is present in the resin composition in an amount of from about 30 to about 95 percent by weight based on total weight of the blowing agents included in the resin composition.

8. A method as set forth in claim 1 wherein the first and second polyether polyols are present in a ratio of from about 1:1 to about 5:1.

9. A method as set forth in claim 1 wherein the step of discharging the reaction mixture is further defined as spraying the reaction mixture at a spray pressure of from about 150 to about 1000 psi and/or a spray rate of from about 1 to about 40 lbs of the reaction mixture per minute.

10. A method as set forth in claim 1 wherein the hydrofluoroolefin is selected from the group of trans-1-chloro-3,3,3-trifluoropropene, 2,3,3,3-tetrafluoropropene, 1,3,3,3-tetrafluoropropene, and combinations thereof.

11. A method as set forth in claim 1 wherein the polyurethane foam article has a closed cell content of greater than 80%.

12. A method as set forth in claim 1 wherein the resin composition mixture has a viscosity of less than about 900 cps at 25° C., and wherein the resin composition mixture has a shelf life of greater than about 6 months.

* * * * *